United States Patent Office 3,306,975
Patented Feb. 28, 1967

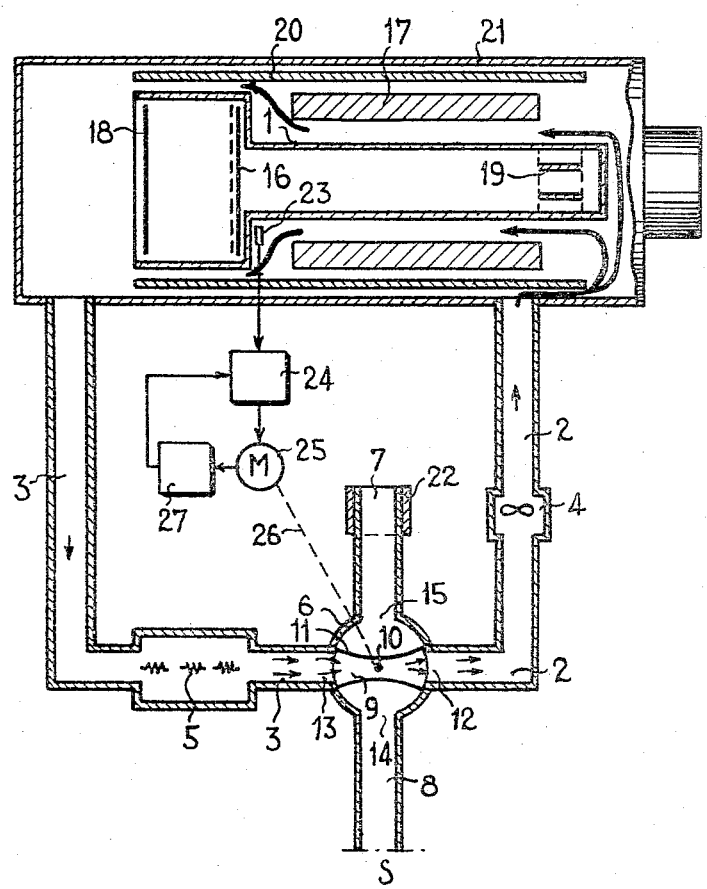

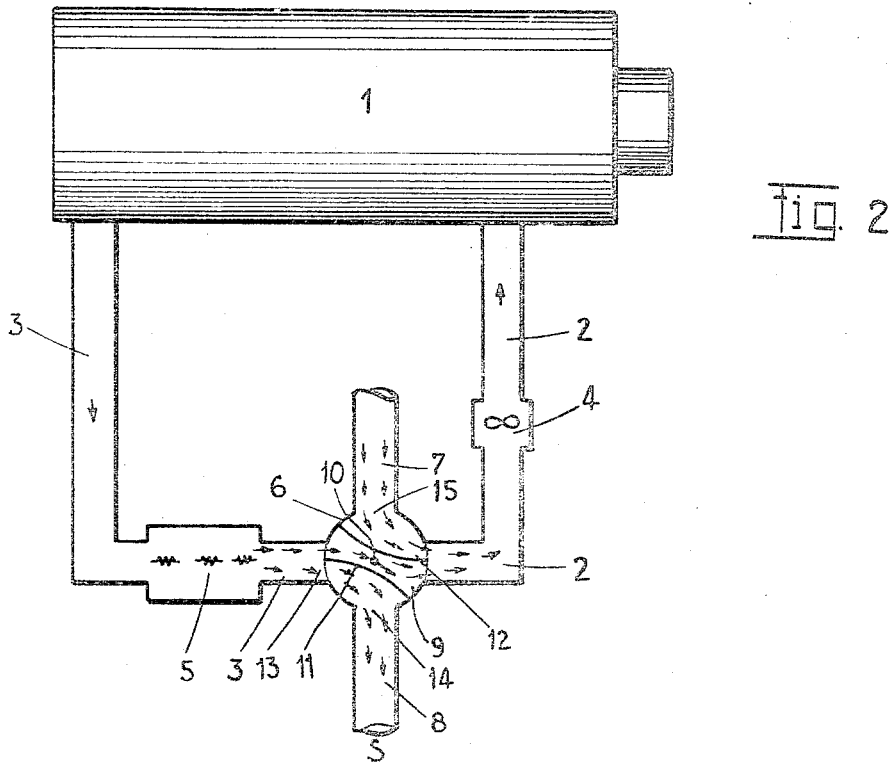
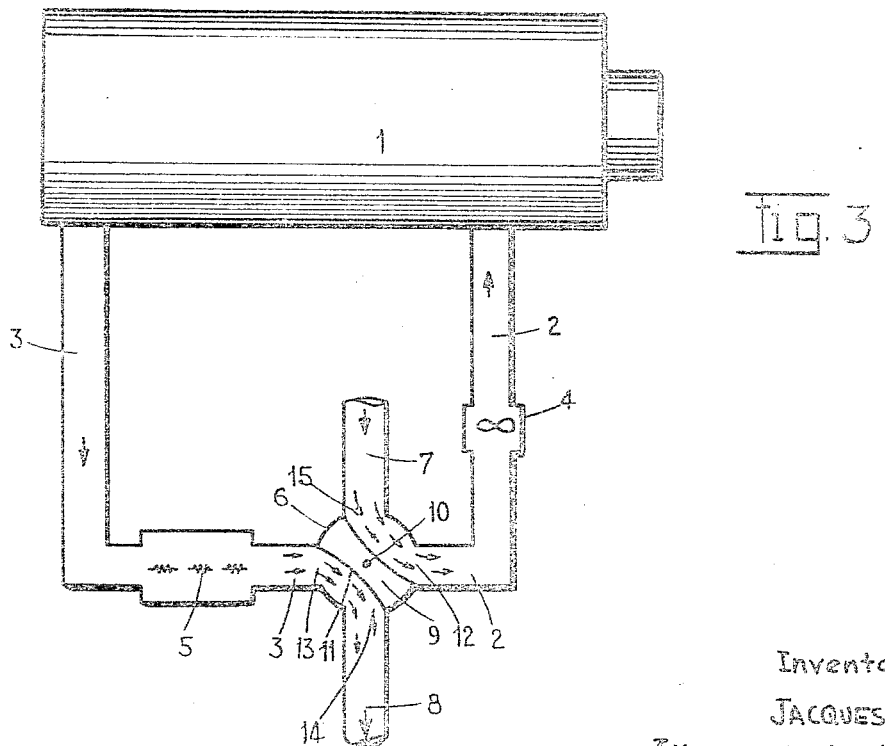

3,306,975
TELEVISION CAMERA SYSTEM HAVING IMPROVED TEMPERATURE CONTROL
Jacques Donnay, Paris France, assignor to Compagnie Francaise Thomson-Houston-Hotchkiss Brandt, a corporation of France
Filed Dec. 2, 1963, Ser. No. 327,184
Claims priority, application France, Dec. 7, 1962, 917,900
6 Claims. (Cl. 178—7.2)

This invention relates to temperature control means for television camera tubes, and is of especial utility in television camera systems using image-orthicon tubes.

Both the image quality and the service life of image-orthicon tubes depend largely on a close regulation of the temperature at and around the target of the tube. While an image-orthicon is especially sensitive to temperature variations, it will be understood that a requirement for temperature control also exists in connection with television camera tubes of other types, and hence the invention is also applicable thereto.

In an image-orthicon the target temperature should, for optimum operation, preferably be regulated to within ±2° C. of a prescribed temperature regardless of operating conditions. These conditions vary considerably, not only because of variations in ambient temperature but also because appreciable heat is dissipated in the operation of the camera and tube circuits, tending to raise the internal temperature. Moreover, in view of the frequently erratic operation of the camera as dictated by shooting requirements, involving prolonged periods of operation interspersed with shutdown periods in which the tube will cool to ambient temperature, the problem of temperature-control of an image-orthicon camera to within the narrow range mentioned above will be seen to be a difficult one.

It has already been proposed to provide such camera systems with air cooling means. However the cooling systems now available have proved themselves unable to maintain the close temperature tolerances that would be desirable, in a continuous manner and under all operating conditions.

Objects of this invention reside in the provision of a cooling system for television cameras which will have greatly increased flexibility and control accuracy over any systems now available, so as to be capable of maintaining extremely close temperature control under all conditions, thereby improving the performance of image-orthicon and other types of camera tubes. A further object is to provide such a cooling system which will be automatic. A further object is to provide such a system which will not involve substantial consumption of power over that normally required in the operation of the camera system, by putting to good use a source of heat that normally is dissipated without profit to atmosphere during operation of the system.

According to the invention there is provided a television camera system comprising in combination a camera tube and temperature-control means associated therewith, which temperature-control means comprises conduits connected to end parts of a casing surrounding the tube and defining a fluid circuit, means for circulating a temperature-control fluid through the circuit, heating means associated with said circuit for heating a fluid flowing therethrough, and valve means connected in said circuit and continuously adjustable between a first end position in which said circuit constitutes a closed loop for circulation heated fluid through the tube and a second end position in which the circuit is open to receive cooling fluid from an external source, e.g. air from the atmosphere, and to discharge heated fluid to the exterior, as well as through a range of intermediate positions, whereby to circulate fluid at a selectable temperature through the tube.

According to a preferred embodiment the heating means comprises electrical resistance forming part of a filter circuit interposed in the power supply of the camera tube.

Preferably also, there is provided a means sensing the temperature within the tube, such as adjacent the target thereof, and servo-mechanism connected for operating the valve means in response to the sensed temperature so as to maintain such temperature within a prescribed range.

The various objects and features of the invention will be apparent from the ensuing description relating to an exemplary embodiment selected by way of illustration but not of limitation and with reference to the accompanying diagrammatic drawings wherein:

FIG. 1 is a general view of a temperature control system according to the invention associated with an image-orthicon tube, with the valve means positioned in the end position corresponding to maximum heating;

FIG. 2 is a similar view, with certain parts of the system omitted, and showing the valve in an intermediate position of adjustment; and FIG. 3 is similar to FIG. 2 but shows the valve in its end position corresponding to maximum cooling.

Illustrated summarily in FIG. 1 is an image-orthicon tube assembly of conventional form and including as its main components a tube 1 having a photocathode 18 and a target 16 mounted in spaced relation in the forward end of the tube, and an electron gun 19 in the rear end thereof. The usual deflector yoke 17 is shown surrounding the tube 1 for deflecting the beam from electron gun 19, and a focussing coil 20 coaxially surrounds the tube around the deflector yoke to create an axial accelerating and focussing field for the electron beam. Since the image orthicon tube per se is conventional and forms no part of the invention further description of it would be superfluous.

The tube assembly includes an outer casing 21 with which connect two air conduits 2 and 3 respectively near the rear and the front end of the tube. Interposed in the conduit 2 is the casing of a fan schematically indicated at 4 and interposed in the conduit 3 is a heater device schematically shown as including a bank of electric resistors 5. The fan 4 may be any suitable type of draft or ventilating fan of simple and inexpensive construction since it is required to operate under constant-velocity and constant-power conditions. The conduits 2 and 3 are shown as connecting with opposite ports, respectively 12 and 13, formed in a generally circular valve casing 6. Casing 6 includes two further diametrically opposed ports 14 and 15, all four ports 12 through 15 being spaced e.g. 90° around the circumference of the valve casing. Connecting with port 15 is an intake pipe 7 which may take in air from the atmosphere, and connected with port 14 is an exhaust pipe 8 which may similarly discharge to the atmosphere. If desired, a cooling device 22 such as a thermoelectric or Peltier-effect cooler, may be associated with the air-intake pipe 7 as shown.

A valve member 9 is rotatably mounted within the casing 6, about a central pivot 10 therein, and is here schematically shown in the form of a vane a passage therethrough having its outer ends formed for sealing sliding engagement with the inner cylindrical surface of casing 6, and dimensioned to correspond with the respective ports 12 and 13. Thus, with valve member 9 positioned as shown in FIG. 1 where the respective ends of the member are in registry with the ports 12 and 13, it will be seen that direct communication is provided between the adjacent ends of conduits 2 and 3, while at the same time said conduits are sealed from pipes 7 and 8, due to suitable sealing engagement (not shown) of the top bottom outer surfaces of valve member 9 against the top and bottom inner surfaces of valve casing 6. In this setting of the valve, it will be clear that the operation of the fan 4 will circulate air in a closed circuit through the heating device 5 and through the tube enclosure 21 thereby increasing the temperature of the tube.

FIG. 2 shows the valve member 9 in an intermediate position in which it directs the heated air from conduit 3 partly through the vane member 9 into the conduit 2 and partly to the discharge pipe 8, while at the same time part of the cooling airflow from air intake pipe 7 is directed into the cooling circuit conduit 2, to mix with the heated air issuing through vane member 9.

Finally FIG. 3 shows the vane or valve member 9 rotated to its opposite end position (as compared to the end position shown in FIG. 1). In this position of the member 9 the heated airflow from conduit 3 is directed wholly to exhaust pipe 8 and the cool airflow from pipe 7 wholly to the conduit 2. This setting of the valve member provides for maximum cooling of the image-orthicon tube 1.

It will be noted that the rotatable vane-like member 9 is provided with concave contoured side walls 11 to serve as deflector means guiding the airstream smoothly along the requisite paths in the position shown in FIG. 3 as well as in the intermediate positions such as that shown in FIG. 2.

In television camera systems it is usual to derive the D.-C. power required for tube operation from an alternating supply by way of suitable rectifying and filtering means. Thus the power supply circuits of the system will usually include resistances which dissipate appreciable heat by Joule effect, and this heat dissipation has generally represented a net loss of energy in conventional systems. According to an advantageous feature of this invention, the heat thus dissipated in the power supply circuitry, especially the filter circuit, of the tube is used as the heat source for the temperature-control system of the invention. Thus a bank of resistors 5 forming part of the filter circuitry may be conveniently arranged within an enlargement of the conduit 3 of the air flow circuit of the invention.

In the temperature-control system of the invention as so far described the valve member 9 may be operated manually. Thus, when the camera is to be placed into operation after a prolonged idle period, with the ambient temperature being relatively cool or cold, the valve member 9 is positioned to the setting of FIG. 1, so that the full flow of air heated by the resistors 5 or other heating means is circulated repeatedly in closed circuit through the tube casing, as indicated by the arrows, the airflow sweeping past the tube 1 between the outer surface of the tube wall and the deflector yoke 17 as indicated, rapidly to heat the tube 1, especially in the areas of it close to the target 16, to its optimum operating temperature. After some time of operation, when appreciable heat is being evolved by the operation of the tube components, valve member 9 may be manually reset to some intermediate position such as that shown in FIG. 2. In these conditions the airflow delivered past the tube 1 is a mixture of heated air that has flowed past heater device 5 and cool air drawn in from the pipe 7 by the action of fan 4. The proportions of the mixture and hence the temperature of the airstream sweeping past the surface of tube 1 are determined by the particular setting of valve member 9, as dictated inter alia by external temperature. Finally in case of prolonged camera operation and/or in hot ambient conditions, the valve member 9 may be set to the position of FIG. 3, in which the airstream discharged through the camera tube casing is composed exclusively of cool air from air intake pipe 7, while the heated air from the heater device 5 is discharged wholly to atmosphere.

According to a preferred form of this invention, the temperature controlling operations just described are performed automatically. In this aspect of the invention, as shown in FIG. 1, a thermocouple 23 or temperature sensing element of other suitable type is mounted within the casing 21 of the camera tube, preferably at a point near the target 16 of the tube 1 as shown. Temperature senser or pickoff 23 converts the temperature variations sensed thereby into variations of electric current or voltage which are applied to a conventional discriminator-amplifier circuit schematically indicated at 24. The amplified reversible-polarity signal derived from circuit 24 is applied to a small reversible electric motor 25 of any suitable type which is connected by way of a mechanical link indicated as the dashed line 26 to the valve member 9. If desired and as here shown the motor 25 may simultaneously operate a suitable positional and/or rate feedback signal generating device 27 whose output is reinjected into an input of the discriminator-amplifier circuit 24 to minimize hunting and improve the response of the control action.

It will be evident that various modifications may be made in the single exemplary embodiment shown and described without exceeding the scope of the invention. Thus valve device used may assume forms other than that of the four-way valve with a vane-shaped valve member rotatable therein, although this form is at present preferred. The servo-mechanism may assume any of various well-known forms.

I claim:

1. A television camera system comprising in combination a camera tube and a casing surrounding the tube, and temperature-control means comprising an inlet conduit and an outlet conduit connected with respective end parts of said casing; fluid circulating means associated with said inlet conduit and operable to circulate fluid therethrough into said casing; heating means associated with said outlet conduit and operable to heat fluid issuing therethrough out of said casing; valve means having a ported valve housing with a first port connected to said outlet conduit beyond an outlet end of said heating means, a second port connected to said inlet conduit ahead of an inlet of said fluid circulating means, and a third and a fourth ports connected to atmosphere; and a valve member displaceable in the valve housing between a first position in which said first and second ports are interconnected and sealed from said third and fourth ports and a second position in which said first and fourth ports are interconnected and said second and third ports are interconnected and sealed from said first and fourth ports, and through a range of intermediate positions in which said first port is connected partly to said second and partly to said fourth while said third port is connected to said second port, whereby to circulate air past the tube at a variable temperature determined by the position of the valve member.

2. The system claimed in claim 1 wherein said camera system has power supply circuitry including a resistance filtering circuit, and wherein said heating means comprises resistance of said circuit.

3. The system claimed in claim 1, including temperature-responsive means positioned for sensing the temperature in said tube, and servo-mechanism connected to said responsive means and including a reversible electric motor mechanically connected to said valve member for displacing said valve member in response to the sensed temperature so as to maintain said temperature within prescribed limits.

4. The system claimed in claim 1 wherein said valve housing has a generally cylindrical peripheral wall with said ports formed in angularly spaced relation therein, and said valve member is rotatable in said housing and is formed with a passage having its ends sealingly slidable over the inner surface of said wall and sealingly registerable with said ports therein.

5. The system claimed in claim 1 wherein said valve housing has a generally cylindrical peripheral wall with said first and fourth ports formed in opposed areas of said wall and said second and third formed in areas angularly spaced from said first areas, and said valve member is a vane-like member extending diametrically of the cylindrical housing and rotatable around the axis thereof, said member having a passage therethrough with its ends sealingly slidable over the inner surface of said wall and selectively registerable with said first and second ports in a first angular position of the member and with solid areas of said wall surface intermediate said ports in said second position of the member so as then to seal off said first and fourth ports from said second and third ports.

6. The system claimed in claim 5 wherein said valve member has outer wall surfaces contoured to provide deflector surfaces for guiding the air flow from said first to said fourth port and from said third to said second port in said second position and in intermediate positions of the valve member.

References Cited by the Examiner

UNITED STATES PATENTS

| | | | |
|---|---|---|---|
| 1,850,069 | 3/1932 | Beatty | 165—34 |
| 2,831,920 | 4/1958 | Furbush | 178—7.2 |
| 3,139,020 | 6/1964 | Schemenauer | 165—36 |
| 3,141,987 | 7/1964 | Altman | 313—17 |

DAVID G. REDINBAUGH, *Primary Examiner.*

J. A. ORSINO, *Assistant Examiner.*